(12) United States Patent  
Sultan et al.

(10) Patent No.: US 11,982,318 B2  
(45) Date of Patent: May 14, 2024

(54) TIE-ROD WITH A SWIVEL END

(71) Applicant: The Boeing Company, Chicago, IL (US)

(72) Inventors: Saif Sultan, Bothell, WA (US); Sean R. Cysewski, Snohomish, WA (US); Abul K. Azad, Woodinville, WA (US); George B. Bojko, Jr., Snohomish, WA (US); Matthew Edmunds, Marysville, WA (US); Christopher E. Plass, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 143 days.

(21) Appl. No.: 17/700,663

(22) Filed: Mar. 22, 2022

(65) Prior Publication Data

US 2022/0316521 A1     Oct. 6, 2022

Related U.S. Application Data

(60) Provisional application No. 63/167,875, filed on Mar. 30, 2021.

(51) Int. Cl.
| | |
|---|---|
| *F16C 7/06* | (2006.01) |
| *F16C 7/02* | (2006.01) |
| *B62D 7/16* | (2006.01) |
| *B62D 7/20* | (2006.01) |
| *F16B 7/06* | (2006.01) |
| *F16B 7/18* | (2006.01) |

(52) U.S. Cl.
CPC .................. *F16C 7/06* (2013.01); *F16C 7/02* (2013.01); *B62D 7/16* (2013.01); *B62D 7/20* (2013.01); *F16B 7/06* (2013.01); *F16B 7/18* (2013.01)

(58) Field of Classification Search
CPC ..... F16C 7/06; F16C 7/02; B62D 7/20; B62D 7/16; F16B 7/18; F16B 31/00; F16B 7/06
See application file for complete search history.

(56) References Cited

U.S. PATENT DOCUMENTS

2009/0218777 A1* 9/2009 Wood ................ B64C 1/06  
                                                              280/93.51  
2013/0168492 A1* 7/2013 Biser .................... B64C 27/605  
                                                              416/168 R

* cited by examiner

*Primary Examiner* — Syed O Hasan  
(74) *Attorney, Agent, or Firm* — Quinn IP Law (57) ABSTRACT

A tie-rod with a swivel tie-rod end includes a tie-rod central rod and a first tie-rod end including a swivel joint. The first tie-rod end is connected to the tie-rod central rod by the swivel joint. The swivel joint is operable to enable rotation of the first tie-rod end with respect to the tie-rod central rod while maintaining a common longitudinal axis between the first tie-rod end and the tie-rod central rod. The tie-rod further includes a second tie-rod end connected to the tie-rod central rod.

18 Claims, 4 Drawing Sheets

TIE-ROD WITH A SWIVEL END

CROSS-REFERENCE TO RELATED APPLICATIONS

This disclosure claims priority to Provisional Patent Application No. 63/167,875 filed on Mar. 30, 2021, which is hereby incorporated by reference.

TECHNICAL FIELD

The concepts described herein relate to a tie-rod with a swivel end.

BACKGROUND

Tie-rods are structural members that transmit force between two connecting objects or structures. Tie-rods may include connecting structures at one or both ends of the tie-rods, for example, including a tie rod end operable to attach the tie rod to a neighboring object. In one embodiment, a tie rod end may include a spherical bearing.

SUMMARY

A tie-rod with a swivel tie-rod end includes a tie-rod central rod and a first tie-rod end including a swivel joint. The first tie-rod end is connected to the tie-rod central rod by the swivel joint. The swivel joint is operable to enable rotation of the first tie-rod end with respect to the tie-rod central rod while maintaining a common longitudinal axis between the first tie-rod end and the tie-rod central rod. The tie-rod further includes a second tie-rod end connected to the tie-rod central rod.

An aspect of the disclosure includes the first tie-rod end further including a connective bearing portion operable to enable attachment of the tie-rod to a neighboring object.

Another aspect of the disclosure includes the swivel joint including a shoulder bolt attached to the connective bearing portion. The shoulder bolt includes a shoulder bolt unthreaded cylindrical portion and a shoulder bolt head portion that is wider than the shoulder bolt unthreaded cylindrical portion. The swivel joint further includes a hollow bolt. The hollow bolt includes a hollow bolt drive head, a hollow bolt shaft including a hollow bolt outer threaded portion, and a hollow bolt inner unthreaded cylindrical surface extending along a longitudinal center of the hollow bolt. The shoulder bolt unthreaded cylindrical portion is inserted within the hollow bolt inner unthreaded cylindrical surface. The shoulder bolt unthreaded cylindrical portion is aligned to the hollow bolt inner unthreaded cylindrical surface and is operable to permit the shoulder bolt to rotate relative to the hollow bolt. The tie-rod central rod includes a central rod inner threaded surface matingly engaged to the hollow bolt outer threaded portion.

Another aspect of the disclosure includes the shoulder bolt including a shoulder bolt threaded portion. The connective bearing portion includes a connective bearing inner threaded surface matingly engaged to the shoulder bolt threaded portion.

Another aspect of the disclosure includes the tie-rod further including a jam nut including a jam nut inner threaded surface. The jam nut inner threaded surface is matingly engaged to the hollow bolt outer threaded portion. The jam nut is operable to limit how far the hollow bolt outer threaded portion is engaged to the central rod inner threaded surface and is operable to control a length of the tie-rod.

Another aspect of the disclosure includes the swivel joint including a shoulder bolt unitarily formed with the connective bearing portion. The shoulder bolt includes a shoulder bolt unthreaded cylindrical portion and a shoulder bolt inner threaded surface within and coaxial to the shoulder bolt unthreaded cylindrical portion. The swivel joint further includes a hollow bolt. The hollow bolt includes a hollow bolt drive head, a hollow bolt shaft including a hollow bolt outer threaded portion, and a hollow bolt inner unthreaded cylindrical surface extending along a longitudinal center of the hollow bolt. The swivel joint further includes a retention bolt including a retention bolt outer threaded portion matingly engaged to the shoulder bolt inner threaded surface. The retention bolt secures the hollow bolt upon the shoulder bolt. The shoulder bolt unthreaded cylindrical portion is inserted within the hollow bolt inner unthreaded cylindrical surface. The shoulder bolt unthreaded cylindrical portion is aligned to the hollow bolt inner unthreaded cylindrical surface and is operable to permit the shoulder bolt to rotate relative to the hollow bolt. The tie-rod central rod includes a central rod inner threaded surface matingly engaged to the hollow bolt outer threaded portion.

Another aspect of the disclosure includes the tie-rod further includes a jam nut including a jam nut inner threaded surface. The jam nut inner threaded surface is matingly engaged to the hollow bolt outer threaded portion. The jam nut is operable to limit how far the hollow bolt outer threaded portion is engaged to the central rod inner threaded surface and is operable to control a length of the tie-rod.

Another aspect of the disclosure includes the swivel joint including a connective bearing outer threaded portion unitarily formed with the connective bearing portion. The swivel joint further includes a connective bearing inner threaded surface within and coaxial to the connective bearing outer threaded portion. The swivel joint further includes a hollow bolt. The hollow bolt includes a hollow bolt drive head, a shaft including a hollow bolt outer threaded portion, and a hollow bolt inner threaded surface extending along a longitudinal center of the hollow bolt. The swivel joint further includes a retention bolt including a retention bolt outer threaded portion matingly engaged to the connective bearing inner threaded surface. The connective bearing outer threaded portion is inserted and matingly engaged to the hollow bolt inner threaded surface. The retention bolt limits travel of the hollow bolt upon the connective bearing outer threaded portion. The tie-rod central rod includes a central rod inner threaded surface matingly engaged to the hollow bolt outer threaded portion.

Another aspect of the disclosure includes the connective bearing outer threaded portion being operable to rotate less than a complete rotation relative to the hollow bolt inner threaded surface to control rotation of the first tie-rod end relative to the tie-rod central rod. The connective bearing threaded portion is operable to rotate more than a complete rotation relative to the hollow bolt inner threaded surface to control a length of the tie-rod.

Another aspect of the disclosure includes the tie-rod further including a jam nut including a jam nut inner threaded surface. The jam nut inner threaded surface is matingly engaged to the hollow bolt outer threaded portion. The jam nut is operable to limit how far the hollow bolt outer threaded portion engaged to the central rod inner threaded surface and is operable to control a length of the tie-rod.

Another aspect of the disclosure includes the connective bearing outer threaded portion being operable to rotate relative to the hollow bolt inner threaded surface to control rotation of the first tie-rod end relative to the tie-rod central rod.

Another aspect of the disclosure includes a system including a tie-rod with a swivel tie-rod end. The system includes the tie-rod. The tie-rod includes a tie-rod central rod and a first tie-rod end. The first tie-rod end includes a swivel joint, wherein the first tie-rod end is connected to the tie-rod central rod by the swivel joint. The swivel joint is operable to enable rotation of the first tie-rod end with respect to the tie-rod central rod while maintaining a common longitudinal axis between the first tie-rod end and the tie-rod central rod. The tie-rod further includes a second tie-rod end connected to the tie-rod central rod. The system further includes a first object connected to the first tie-rod end and a second object connected to the second tie-rod end.

Another aspect of the disclosure includes the first tie-rod end including a first spherical bearing. The second tie-rod end includes a second spherical bearing. The tie rod is operable to transmit an axial force through the tie-rod from the first object to the second object.

Another aspect of the disclosure includes the first tie-rod end further including a connective bearing portion including the first spherical bearing. The swivel joint includes a shoulder bolt attached to the connective bearing portion. The shoulder bolt includes a shoulder bolt unthreaded cylindrical portion and a shoulder bolt head portion wider than the shoulder bolt unthreaded cylindrical portion. The swivel joint further includes a hollow bolt. The hollow bolt includes a hollow bolt drive head, a hollow bolt shaft including a hollow bolt outer threaded portion, and a hollow bolt inner unthreaded cylindrical surface extending along a longitudinal center of the hollow bolt. The shoulder bolt unthreaded cylindrical portion is inserted within the hollow bolt inner unthreaded cylindrical surface. The shoulder bolt unthreaded cylindrical portion is aligned to the hollow bolt inner unthreaded cylindrical surface and is operable to permit the shoulder bolt to rotate relative to the hollow bolt. The tie-rod central rod includes a central rod inner threaded surface matingly engaged to the hollow bolt outer threaded portion. The shoulder bolt includes a shoulder bolt outer threaded portion. The connective bearing portion includes a connective bearing inner threaded surface matingly engaged to the shoulder bolt outer threaded portion.

Another aspect of the disclosure includes the system further including a jam nut. The jam nut includes a jam nut inner threaded surface. The jam nut inner threaded surface is matingly engaged to the hollow bolt outer threaded portion. The jam nut is operable to limit how far the hollow bolt outer threaded portion is engaged to the central rod inner threaded surface and is operable to control a length of the tie-rod.

Another aspect of the disclosure includes the first tie-rod end further including a connective bearing portion including the first spherical bearing. The swivel joint includes a shoulder bolt unitarily formed with the connective bearing portion. The shoulder bolt includes a shoulder bolt unthreaded cylindrical portion. The shoulder bolt further includes a shoulder bolt inner threaded surface within and coaxial to the shoulder bolt unthreaded cylindrical portion. The swivel joint further includes a hollow bolt. The hollow bolt includes a hollow bolt drive head, a hollow bolt shaft including a hollow bolt outer threaded portion, and a hollow bolt inner unthreaded cylindrical surface extending along a longitudinal center of the hollow bolt. The swivel joint further includes a retention bolt including a retention bolt outer threaded portion matingly engaged to the shoulder bolt inner threaded surface. The retention bolt secures the hollow bolt upon the shoulder bolt. The shoulder bolt unthreaded cylindrical portion is inserted within the hollow bolt inner unthreaded cylindrical surface. The shoulder bolt unthreaded cylindrical portion is aligned to the hollow bolt inner unthreaded cylindrical surface and is operable to permit the shoulder bolt to rotate relative to the hollow bolt. The tie-rod central rod includes a central rod inner threaded surface matingly engaged to the hollow bolt outer threaded portion.

Another aspect of the disclosure includes the system further including a jam nut including a jam nut inner threaded surface. The jam nut inner threaded surface is matingly engaged to the hollow bolt outer threaded portion. The jam nut is operable to limit how far the hollow bolt outer threaded portion is engaged to the central rod inner threaded surface and is operable to control a length of the tie-rod.

Another aspect of the disclosure includes the first tie-rod end further including a connective bearing portion including the first spherical bearing. The swivel joint includes a connective bearing outer threaded portion unitarily formed with the connective bearing portion. The swivel joint further includes a connective bearing inner threaded surface within and coaxial to the connective bearing outer threaded portion. The swivel joint further includes a hollow bolt. The hollow bolt includes a hollow bolt drive head, a shaft including a hollow bolt outer threaded portion, and a hollow bolt inner threaded surface extending along a longitudinal center of the hollow bolt. The swivel joint further includes a retention bolt including a retention bolt outer threaded portion matingly engaged to the connective bearing inner threaded surface. The connective bearing outer threaded portion is inserted and matingly engaged to the hollow bolt inner threaded surface. The retention bolt limits travel of the hollow bolt upon the connective bearing outer threaded portion. The tie-rod central rod includes a central rod inner threaded surface matingly engaged to the hollow bolt outer threaded portion.

Another aspect of the disclosure includes the connective bearing outer threaded portion being operable to rotate less than a complete rotation relative to the hollow bolt inner threaded surface to control rotation of the first tie-rod end relative to the tie-rod central rod. The connective bearing outer threaded portion is operable to rotate more than a complete rotation relative to the hollow bolt inner threaded surface to control a length of the tie-rod.

Another aspect of the disclosure includes the system further including a jam nut including a jam nut inner threaded surface. The jam nut inner threaded surface is matingly engaged to the hollow bolt outer threaded portion. The jam nut is operable to limit how far the hollow bolt outer threaded portion is engaged to the central rod inner threaded surface and is operable to control a length of the tie-rod. The connective bearing outer threaded portion is operable to rotate relative to the hollow bolt inner threaded surface to control rotation of the first tie-rod end relative to the tie-rod central rod.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. It should be understood that throughout the drawings, corresponding reference numerals indicate like or corresponding parts and features.

Tie-rods are used as structural members in a variety of application. In one embodiment, a linear tie-rod with a spherical bearings incorporated in each of the two tie rod ends may act as a two force member, wherein force applied through the tie-rod is limited to an axial force. Tie-rods provide flexibility in moving structural members and applications where a force must be transmitted between one neighboring structural member and another neighboring.

A tie-rod with a swivel tie-rod end is provided. The tie-rod includes a tie-rod central rod, a first tie-rod end, and a second tie-rod end connected to the tie-rod central rod. The first tie-rod end includes a swivel joint, wherein the first tie-rod end is connected to the tie-rod central rod by the swivel joint and wherein the swivel joint is operable to enable rotation of the first tie-rod end with respect to the tie-rod central rod while maintaining a common longitudinal axis between the first tie-rod end and the tie-rod central rod.

The first tie-rod end may include hardware or a fitting useful to connect the tie-rod to another object. In one embodiment, the first tie-rod end includes a connective bearing portion operable to enable attachment of the tie-rod to a neighboring object.

Three non-limiting embodiments of the tie-rod with a swivel tie-rod end may be described, with variations of each embodiment. According to a first embodiment, the swivel joint includes a shoulder bolt attached to the connective bearing portion. The shoulder bolt includes an unthreaded cylindrical portion and a head portion wider than the unthreaded cylindrical portion. The swivel joint further includes a hollow bolt. In some instances, the hollow bolt may be described as a bearing. The hollow bolt includes a drive head operable to be turned by a tool such as a crescent wrench, a shaft including a threaded portion, and an unthreaded inner cylindrical surface extending along a longitudinal center of the hollow bolt. The shoulder bolt is inserted within the hollow unthreaded inner cylindrical surface. The unthreaded inner cylindrical portion is aligned to the unthreaded inner cylindrical surface and is operable to permit the shoulder bolt to rotate relative to the unthreaded inner cylindrical portion. The tie-rod central rod includes an inner threaded surface matingly engaged to the threaded portion of the shaft of the hollow bolt.

In some embodiments, in the first embodiment, the shoulder bolt includes a threaded portion, and the connective bearing portion includes an inner threaded surface matingly engaged to the threaded portion of the shoulder bolt.

In some embodiments, the first embodiment includes a jam nut including an inner threaded surface. The inner threaded surface of the jam nut is matingly engaged to the threaded portion of the shaft of the hollow bolt and is operable to limit how far the threaded portion of the hollow bolt is engaged to the inner threaded surface of the tie-rod central rod. The position of the jam nut upon the hollow bolt is operable to control a length of the tie-rod.

According to a second embodiment, the swivel joint includes a shoulder bolt unitarily formed with the connective bearing portion. The shoulder bolt includes an unthreaded cylindrical portion and a threaded portion upon an outer surface of the shoulder bolt and disposed distal from the connective bearing portion. The shoulder bolt further includes an inner threaded surface within and coaxial to the threaded portion upon the outer surface of the shoulder bolt. The swivel joint further includes a hollow bolt. In some instances, the hollow bolt may be described as a bearing. The hollow bolt includes a drive head operable to be turned by a tool such as a crescent wrench, a shaft including a threaded portion, and an unthreaded inner cylindrical surface extending along a longitudinal center of the hollow bolt. The swivel joint further includes a retention bolt including a threaded portion fasteningly attached to the inner threaded surface of the shoulder bolt. The retention bolt secures the hollow bolt upon the shoulder bolt. The shoulder bolt is inserted within the hollow unthreaded inner cylindrical surface. The unthreaded inner cylindrical portion is aligned to the unthreaded inner cylindrical surface and is operable to permit the shoulder bolt to rotate relative to the unthreaded inner cylindrical portion. The tie-rod central rod includes an inner threaded surface matingly engaged to the threaded portion of the shaft of the hollow bolt.

In some embodiments, the second embodiment includes a jam nut including an inner threaded surface. The inner threaded surface of the jam nut is matingly engaged to the threaded portion of the shaft of the hollow bolt and is operable to limit how far the threaded portion of the hollow bolt is engaged to the inner threaded surface of the tie-rod central rod and is operable to control a length of the tie-rod.

According to a third embodiment, the swivel joint includes the connective portion, wherein an external threaded portion unitarily formed with the connective bearing portion. Additionally, the connective portion includes an inner threaded surface within and coaxial to the external threaded portion. The swivel joint further includes a hollow bolt. In some instances, the hollow bolt may be described as a bearing. The hollow bolt includes a drive head operable to be turned by a tool such as a crescent wrench, a shaft including a threaded portion, and a threaded inner surface extending along a longitudinal center of the hollow bolt. The swivel joint further includes a retention bolt including a threaded portion fasteningly attached to the inner threaded surface of the external threaded portion. The external threaded portion is inserted and matingly engaged to the threaded inner surface of the hollow bolt. The retention bolt limits travel of the hollow bolt upon the external threaded portion. The tie-rod central rod includes an inner threaded surface matingly engaged to the threaded portion of the shaft of the hollow bolt.

In some embodiments, in the third embodiment, the external threaded portion of the connective bearing portion is operable to rotate less than a full turn relative to the threaded inner surface of the hollow bolt to control rotation of the first tie-rod end relative to the tie-rod central rod. Additionally, the external threaded portion of the connective bearing portion is operable to rotate more than a full turn relative to the threaded inner surface of the hollow bolt to control a length of the tie-rod.

In some embodiments, the third embodiment includes a jam nut including an inner threaded surface. The inner threaded surface of the jam nut is matingly engaged to the threaded portion of the shaft of the hollow bolt and is operable to limit how far the threaded portion of the hollow bolt is engaged to the inner threaded surface of the tie-rod central rod and is operable to control a length of the tie-rod.

In some embodiments, the external threaded portion of the connective bearing portion is operable to rotate relative to the threaded inner surface of the hollow bolt to control rotation of the first tie-rod end relative to the tie-rod central rod.

Each of the three described embodiments may be described as a portion of a system including a tie-rod. Such a system may be described as the tie-rod, a first object connected to a first tie-rod end of the tie-rod, and a second object connected to a second tie-rod end of the tie-rod.

Tie-rods provide a defined distance between a first tie-rod end of the tie-rod and a second tie-rod end of the tie-rod. The defined distance is generated by or a product of the geometry of the tie rod ends and a length of a rigid tie-rod central member or central rod.

Figure 1:
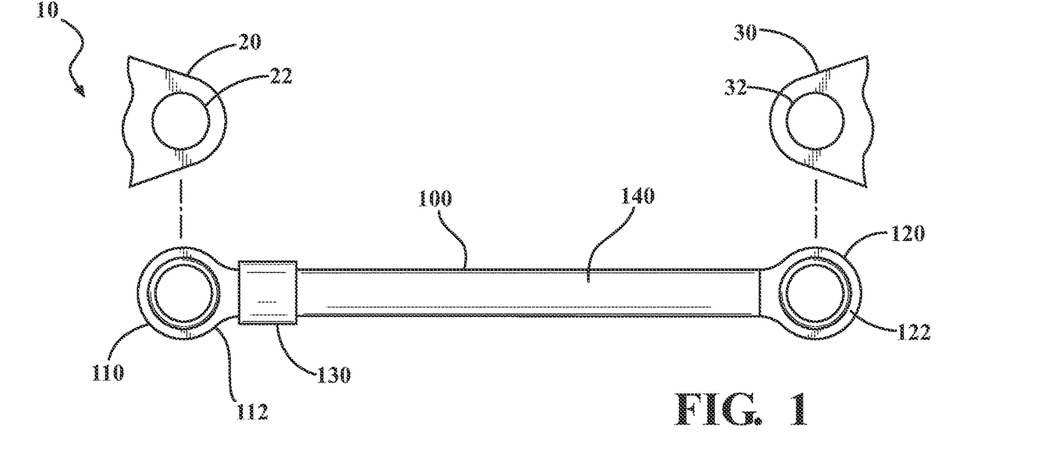
FIG. 1 schematically illustrates in front view a system including an exemplary tie-rod including a swivel tie-rod end, in accordance with the disclosure.

FIG. 1 schematically illustrates a system 10 including an exemplary tie-rod 100 including a swivel tie-rod end. System 10 includes the tie-rod 100, a first object 20 connected to a first end 110 of the tie-rod 100, and a second object 30 attached to a second end 120 of the tie-rod 100. The first end 110 may include a connective bearing portion 112 operable to enable a desired motion between the first object 20 and the tie-rod 100. In one embodiment, the first end may include a spherical bearing. The connective bearing portion 112 is operable to be connected to post 22 of the first object 20. The second end 120 may include a connective bearing portion 112 operable to enable a desired motion between the second object 30 and the tie-rod 100. In one embodiment, the second end may include a spherical bearing. The connective bearing portion 122 is operable to be connected to post 32 of the second object 30.

A tie-rod may be configured for a particular first object and particular second object to be connected. In such a configuration, the length of the tie rod 100 may be important. Additionally or alternatively, a rotation of the first end 110 with respect to the second end 120 may be important. As a result, a company that designs and/or manufactures tie-rods may have hundreds of tie-rod configurations that are manufactured separately and are treated as separate and distinct parts to be managed. The tie-rod 100 includes a swivel joint 130 connecting the first end 110 to a tie-rod central rod 140.

The swivel joint 130 may be operable to enable rotation of the first tie-rod end 110 with respect to the tie-rod central rod 140 while maintaining a common longitudinal axis between the first tie-rod end 110 and the tie-rod central rod 140. In this way, the swivel joint 130 may enable a common tie-rod 100 to be utilized in applications where the post 22 varies in rotation from the post 32.

The swivel joint 130 may be operable to enable adjustment of a length of the tie-rod 100. In this way, the swivel joint 130 may enable a common tie-rod 100 to be utilized in applications where the post 22 is located at different distances from the post 32.

The swivel joint 130 may be operable to enable rotation of the first tie-rod end 110 with respect to the tie-rod central rod 140 and additionally enable adjustment of a length of the tie-rod 100. In this way, the swivel joint 130 may enable a common tie-rod 100 to be utilized in applications where the post 22 is located at different distances from and different rotations in relation to the post 32. By enabling rotation of the first end 110 in relation to the second end 120 and/or adjustment of a length of the tie-rod 100, a single, adjustable tie-rod 100 with a swivel tie-rod end may be utilized in a variety of applications that otherwise would utilize an equal variety of distinct and specific tie-rods.

Figure 2:
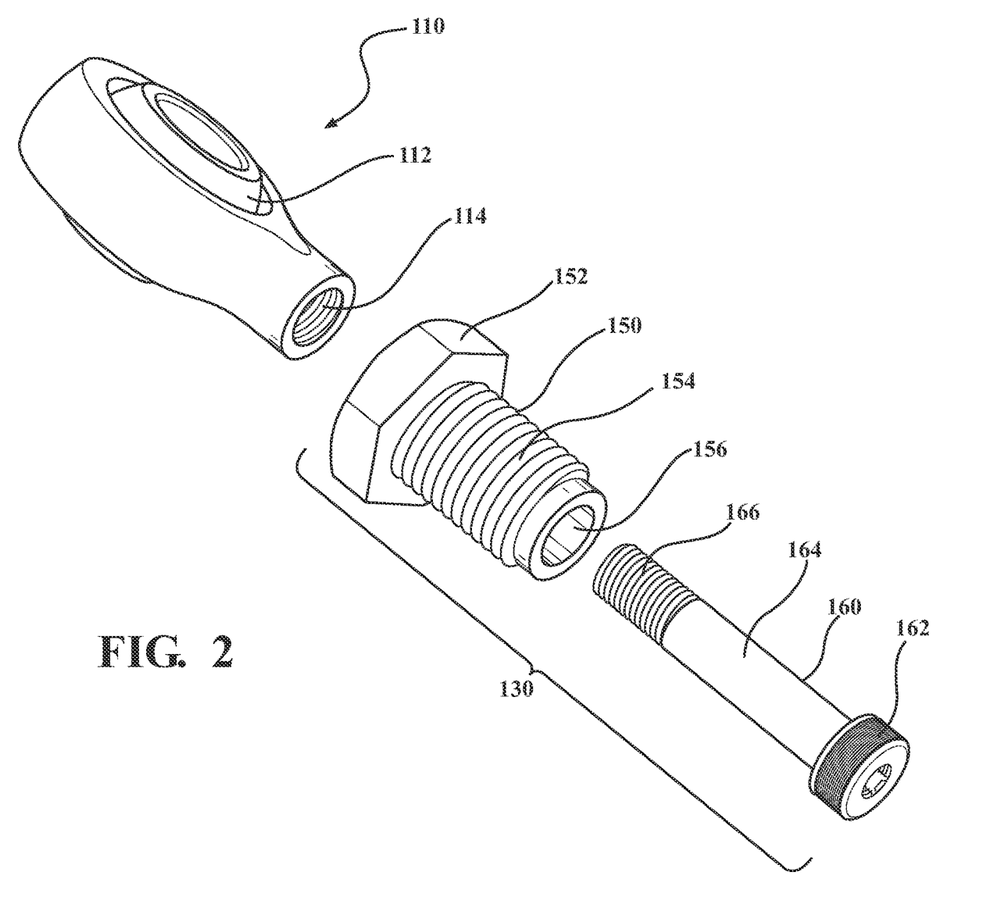
FIG. 2 schematically illustrates in perspective exploded assembly view an exemplary first tie-rod end of the tie-rod of FIG. 1, including components creating a swivel joint in the tie-rod, in accordance with the disclosure.

FIG. 2 schematically illustrates in perspective exploded assembly view an exemplary first tie-rod end 110 of the tie-rod 100, including components creating the swivel joint 130 in the tie-rod 100 in accordance with the first embodiment of the disclosure. The swivel joint 130 is illustrated including the shoulder bolt 160, the hollow bolt 150, and a connective bearing portion 112. The shoulder bolt 160 is operable to be attached to the connective bearing portion 112. The shoulder bolt 160 includes a shoulder bolt unthreaded cylindrical portion 164, a shoulder bolt head portion 162 wider than the shoulder bolt unthreaded cylindrical portion 164, and a shoulder bolt threaded portion 166. The connective bearing portion 112 includes a connective bearing inner threaded surface 114 operable to matingly engaged to the shoulder bolt threaded portion 166. The hollow bolt 150 includes a hollow bolt drive head 152, a hollow bolt shaft including a hollow bolt outer threaded portion 154, and a hollow bolt inner unthreaded cylindrical surface 156 extending along a longitudinal center of the hollow bolt 150.

The shoulder bolt unthreaded cylindrical portion 164 is operable to be inserted within the hollow bolt inner unthreaded cylindrical surface 156. The shoulder bolt unthreaded cylindrical portion 164 is operable to be aligned to the hollow bolt inner unthreaded cylindrical surface 156 and is operable to permit the shoulder bolt 160 to rotate relative to the hollow bolt 150.

Figure 3:
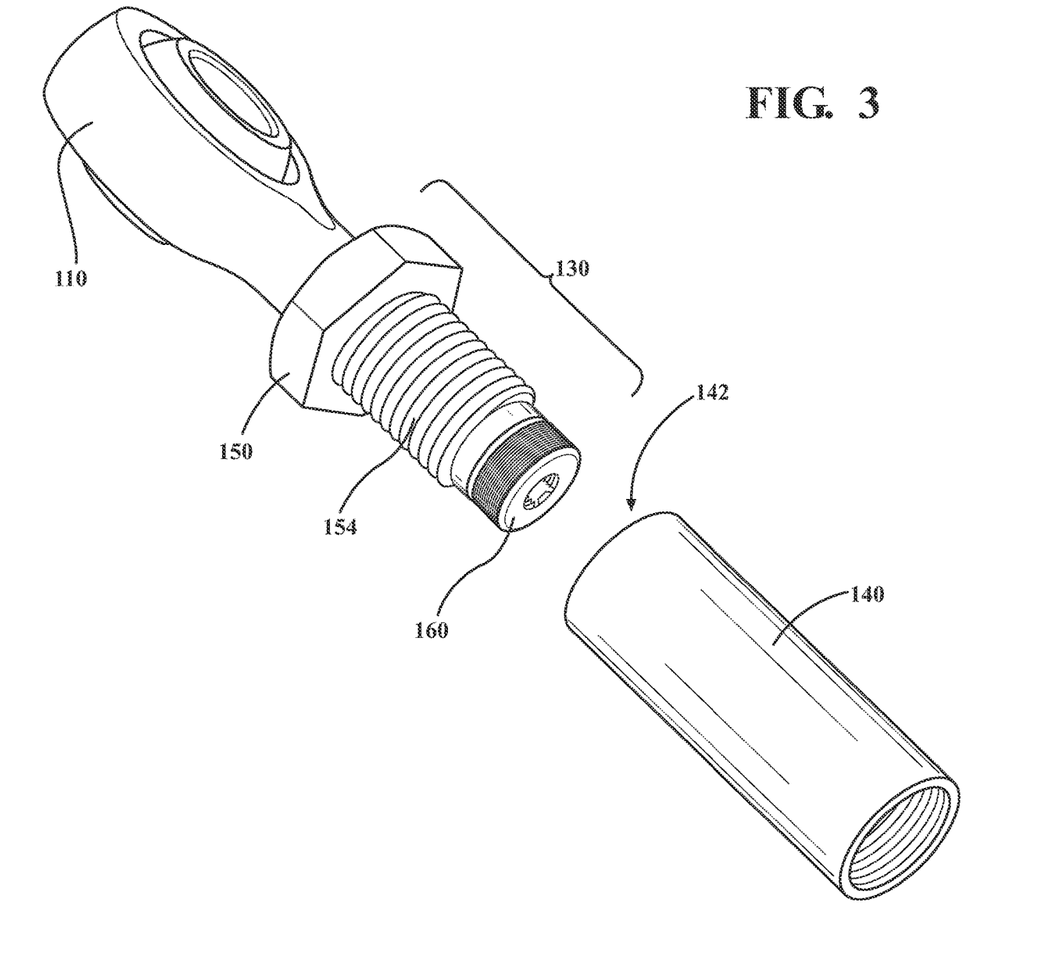
FIG. 3 schematically illustrates in perspective assembled view the first tie-rod end of FIG. 2 in preparation for being assembled to a tie-rod central rod, in accordance with the disclosure.

FIG. 3 schematically illustrates in perspective assembled view the first tie-rod end of FIG. 2 in preparation for being assembled to a tie-rod central rod, in accordance with the disclosure. The tie-rod first end 110 is illustrated including the swivel joint 130 including the hollow bolt 150 and the shoulder bolt 160. The shoulder bolt 160 is illustrated fastened in place and retaining the hollow bolt 150 to the tie-rod first end 110. The tie-rod central rod 140 includes a central rod inner threaded surface 142 operable to be matingly engaged to the hollow bolt outer threaded portion 154.

A jam nut including a jam nut inner threaded surface may be assembled to the hollow bolt outer threaded portion 154. The jam nut inner threaded surface may be matingly engaged to the hollow bolt outer threaded portion 154 and is operable to limit how far the hollow bolt outer threaded portion 154 is engaged to the central rod inner threaded surface 142 and is operable to control a length of the tie-rod 100.

Figure 4:
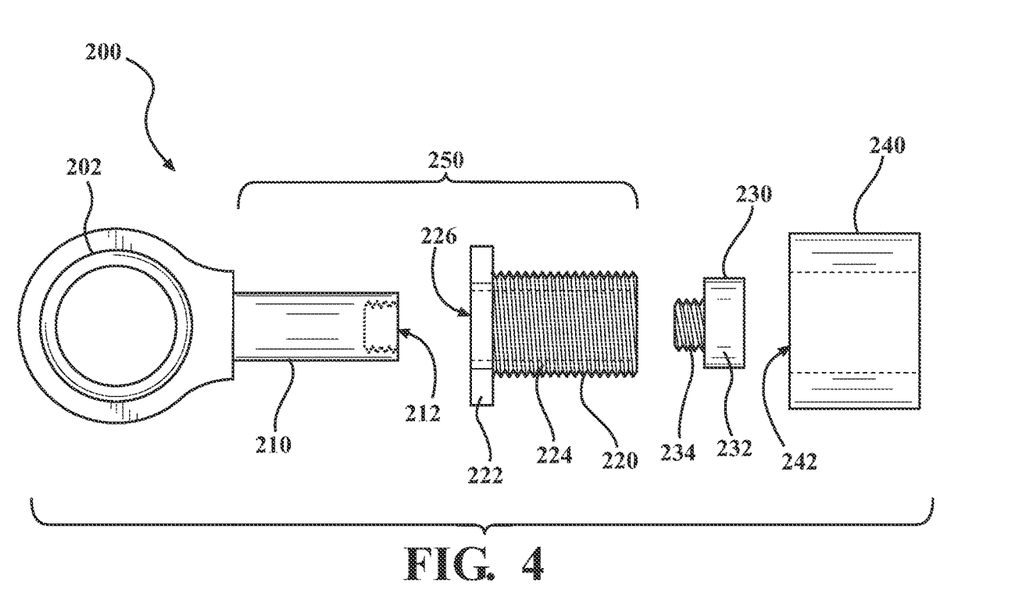
FIG. 4 schematically illustrates in front exploded assembly view a second exemplary embodiment of a first tie-rod end of the tie-rod of FIG. 1, in accordance with disclosure.

FIG. 4 schematically illustrates in front exploded assembly view an alternative first tie-rod end 200 of the tie-rod 100 in accordance with the second embodiment of the disclosure. A swivel joint 250 is illustrated and includes a shoulder bolt unitarily formed with the connective bearing portion 202. The shoulder bolt includes a shoulder bolt unthreaded cylindrical portion 210 and a shoulder bolt inner threaded surface 212 within and coaxial to the shoulder bolt unthreaded cylindrical portion 210. The swivel joint 250 further includes a hollow bolt 220. The hollow bolt 220 includes a hollow bolt drive head 222, a hollow bolt shaft including a hollow bolt outer threaded portion 224, and a hollow bolt inner unthreaded cylindrical surface 226 extending along a longitudinal center of the hollow bolt 220. The first tie-rod end 200 further includes a retention bolt 230. The retention bolt 230 includes a retention bolt head 232 and a retention bolt outer threaded portion 234 operable to be matingly engaged to the shoulder bolt inner threaded surface 212.

The retention bolt 230 secures the hollow bolt 220 upon the shoulder bolt unthreaded cylindrical portion 210. The shoulder bolt unthreaded cylindrical portion 210 is operable to be inserted within the hollow bolt inner unthreaded cylindrical surface 226. The shoulder bolt unthreaded cylindrical portion 210 is operable to be aligned to the hollow bolt inner unthreaded cylindrical surface 226 and is operable to permit the shoulder bolt of the first tie-rod end 200 to rotate relative to the hollow bolt 220. The tie-rod central rod 240 includes a central rod inner threaded surface 242 operable to be matingly engaged to the hollow bolt outer threaded portion 224.

A jam nut including a jam nut inner threaded surface may be assembled to the hollow bolt outer threaded portion 224. The jam nut inner threaded surface may be matingly engaged to the hollow bolt outer threaded portion 224 and is operable to limit how far the hollow bolt outer threaded portion 224 is engaged to the central rod inner threaded surface 242 and is operable to control a length of the tie-rod 100.

Figure 5:
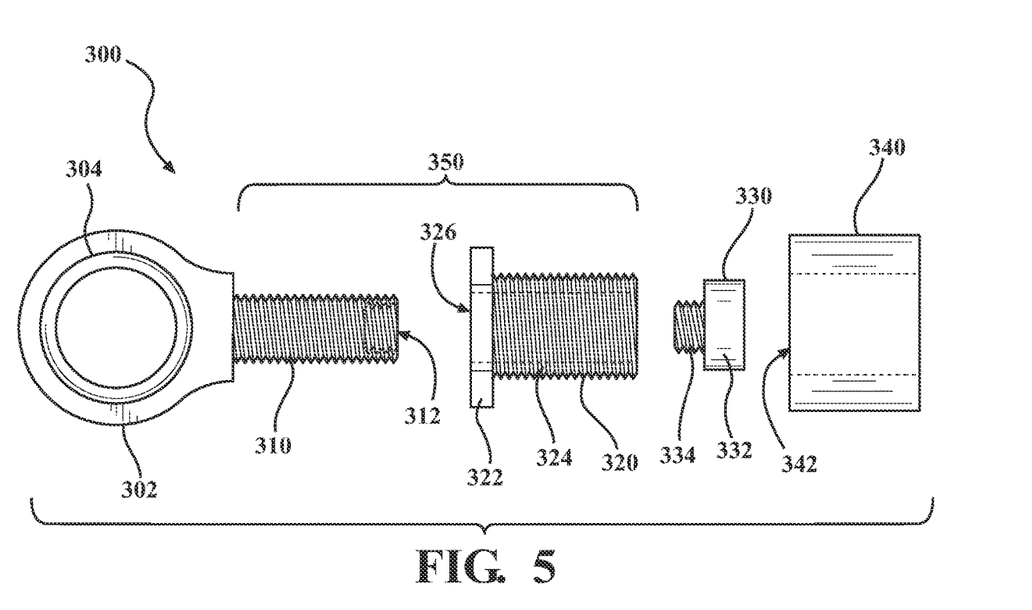
FIG. 5 schematically illustrates in front exploded assembly view a third exemplary embodiment of a first tie-rod end of the tie-rod of FIG. 1, in accordance with disclosure.

FIG. 5 schematically illustrates in front exploded assembly view of an additional alternative first tie-rod end 300 of the tie-rod 100 in accordance with the third embodiment of the disclosure. The swivel joint 350 includes a connective bearing outer threaded portion 310 unitarily formed with the connective bearing portion 302 and including a connective bearing inner threaded surface 312 within and coaxial to the connective bearing outer threaded portion 310. The swivel joint 350 further includes a hollow bolt 320. The hollow bolt 320 includes a hollow bolt drive head 322, a shaft including a hollow bolt outer threaded portion 324, and a hollow bolt inner threaded surface 326 extending along a longitudinal center of the hollow bolt 320. The first tie-rod end 300 further includes a retention bolt 330. The retention bolt 330 includes a retention bolt head 332 and a retention bolt outer threaded portion 334 operable to be matingly engaged to the connective bearing inner threaded surface 312.

The connective bearing outer threaded portion 310 is operable to be inserted and matingly engaged to the hollow bolt inner threaded surface 326. The retention bolt 330 limits travel of the hollow bolt 320 upon the connective bearing outer threaded portion 310. The tie-rod central rod 340 includes a central rod inner threaded surface 342 operable to be matingly engaged to the hollow bolt outer threaded portion 324.

Figure 6:
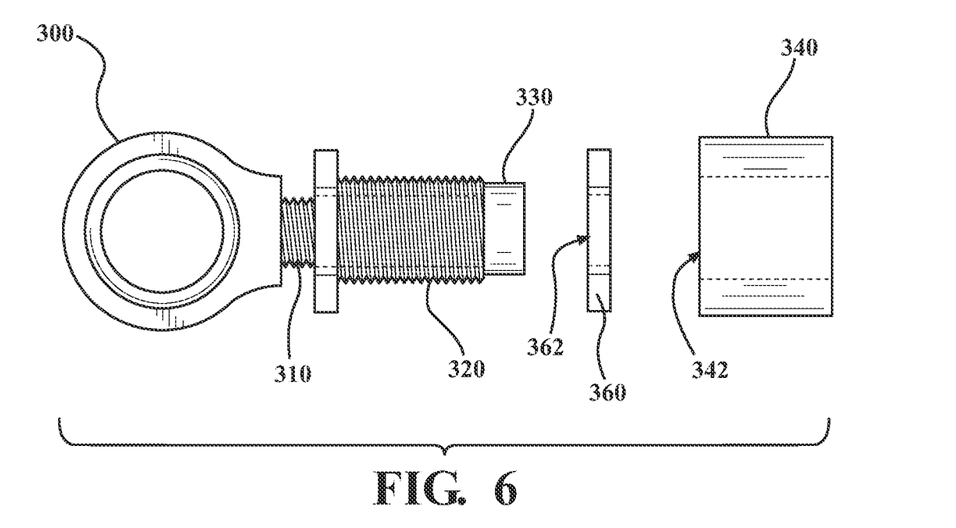
FIG. 6 schematically illustrates in front assembled view the first tie-rod end of FIG. 5 including an optional jam nut in preparation for being assembled to a tie-rod central rod, in accordance with the disclosure.

FIG. 6 schematically illustrates in front assembled view the first tie-rod end 300 including an optional jam nut 360 in preparation for being assembled to the tie-rod central rod 340. Connective bearing outer threaded portion 310 is illustrated matingly engaged to the hollow bolt inner threaded surface of the hollow bolt 320. The retention bolt 330 is illustrated matingly engaged to the connective bearing inner threaded surface. The jam nut 360 is illustrated including a jam nut inner threaded surface 362 operable to be assembled to the hollow bolt outer threaded portion of the hollow bolt 320. The jam nut 360 and is operable to limit how far the hollow bolt outer threaded portion is engaged to the central rod inner threaded surface 342 and is operable to control a length of the tie-rod 100.

Figure 7:
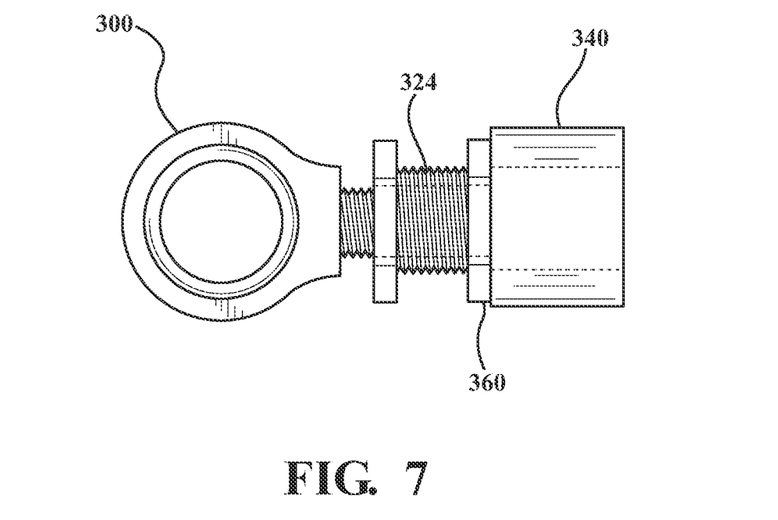
FIG. 7 schematically illustrates in front assembled view the first tie-rod end, the jam nut, and the tie-rod central rod of FIG. 6, in accordance with the disclosure.

FIG. 7 schematically illustrates in front assembled view the first tie-rod end 300, the jam nut 360, and the tie-rod central rod 340. The jam nut 360 is illustrated securely fastened to the hollow bolt outer threaded portion 324 and seated against the tie-rod central rod 340. By adjusting a location of the jam nut 360 upon the hollow bolt outer threaded portion 324 prior to inserting and fastening the hollow bolt outer threaded portion 324 into the tie-rod central rod 340, an overall length of the tie-rod 100 may be set or determined.

The following Clauses provide example configurations of a tie-rod with a swivel tie-rod end a system including a tie-rod with a swivel tie-rod end, as disclosed herein.

Clause 1: A tie-rod with a swivel tie-rod end, comprising: a tie-rod central rod; a first tie-rod end including a swivel joint, wherein the first tie-rod end is connected to the tie-rod central rod by the swivel joint and wherein the swivel joint is operable to enable rotation of the first tie-rod end with respect to the tie-rod central rod while maintaining a common longitudinal axis between the first tie-rod end and the tie-rod central rod; and a second tie-rod end connected to the tie-rod central rod.

Clause 2: The tie-rod of Clause 1, wherein the first tie-rod end further includes a connective bearing portion operable to enable attachment of the tie-rod to a neighboring object.

Clause 3: The tie-rod of Clause 2, wherein the swivel joint includes: a shoulder bolt attached to the connective bearing portion, wherein the shoulder bolt includes: a shoulder bolt unthreaded cylindrical portion; and a shoulder bolt head portion wider than the shoulder bolt unthreaded cylindrical portion; and a hollow bolt including: a hollow bolt drive head; a hollow bolt shaft including a hollow bolt outer threaded portion; and a hollow bolt inner unthreaded cylindrical surface extending along a longitudinal center of the hollow bolt; wherein the shoulder bolt unthreaded cylindrical portion is inserted within the hollow bolt inner unthreaded cylindrical surface; wherein the shoulder bolt unthreaded cylindrical portion is aligned to the hollow bolt inner unthreaded cylindrical surface and is operable to permit the shoulder bolt to rotate relative to the hollow bolt;

and wherein the tie-rod central rod includes a central rod inner threaded surface matingly engaged to the hollow bolt outer threaded portion.

Clause 4: The tie-rod of Clause 3, wherein the shoulder bolt includes a shoulder bolt threaded portion; and wherein the connective bearing portion includes a connective bearing inner threaded surface matingly engaged to the shoulder bolt threaded portion.

Clause 5: The tie-rod of Clause 3, further including a jam nut including a jam nut inner threaded surface; wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

Clause 6. The tie-rod of Clause 2, wherein the swivel joint includes: a shoulder bolt unitarily formed with the connective bearing portion, wherein the shoulder bolt includes: a shoulder bolt unthreaded cylindrical portion; and a shoulder bolt inner threaded surface within and coaxial to the shoulder bolt unthreaded cylindrical portion; a hollow bolt including: a hollow bolt drive head; a hollow bolt shaft including a hollow bolt outer threaded portion; and a hollow bolt inner unthreaded cylindrical surface extending along a longitudinal center of the hollow bolt; and a retention bolt including a retention bolt outer threaded portion matingly engaged to the shoulder bolt inner threaded surface; wherein the retention bolt secures the hollow bolt upon the shoulder bolt; wherein the shoulder bolt unthreaded cylindrical portion is inserted within the hollow bolt inner unthreaded cylindrical surface; wherein the shoulder bolt unthreaded cylindrical portion is aligned to the hollow bolt inner unthreaded cylindrical surface and is operable to permit the shoulder bolt to rotate relative to the hollow bolt; and wherein the tie-rod central rod includes a central rod inner threaded surface matingly engaged to the hollow bolt outer threaded portion.

Clause 7. The tie-rod of Clause 6, further including a jam nut including a jam nut inner threaded surface; wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

Clause 8: The tie-rod of Clause 2, wherein the swivel joint includes: a connective bearing outer threaded portion unitarily formed with the connective bearing portion and including a connective bearing inner threaded surface within and coaxial to the connective bearing outer threaded portion; a hollow bolt including: a hollow bolt drive head; a shaft including a hollow bolt outer threaded portion; and a hollow bolt inner threaded surface extending along a longitudinal center of the hollow bolt; and a retention bolt including a retention bolt outer threaded portion matingly engaged to the connective bearing inner threaded surface; wherein the connective bearing outer threaded portion is inserted and matingly engaged to the hollow bolt inner threaded surface; wherein the retention bolt limits travel of the hollow bolt upon the connective bearing outer threaded portion; and wherein the tie-rod central rod includes a central rod inner threaded surface matingly engaged to the hollow bolt outer threaded portion.

Clause 9: The tie-rod of Clause 8, wherein the connective bearing outer threaded portion is operable to rotate less than a complete rotation relative to the hollow bolt inner threaded surface to control rotation of the first tie-rod end relative to the tie-rod central rod; and wherein the connective bearing threaded portion is operable to rotate more than a complete rotation relative to the hollow bolt inner threaded surface to control a length of the tie-rod.

Clause 10: The tie-rod of Clause 8, further including a jam nut including a jam nut inner threaded surface; wherein the jam nut inner threaded surface is matingly engaged to the hollow bolt outer threaded portion; and wherein the jam nut is operable to limit how far the hollow bolt outer threaded portion engaged to the central rod inner threaded surface and is operable to control a length of the tie-rod.

Clause 11: The tie-rod of Clause 10, wherein the connective bearing outer threaded portion is operable to rotate relative to the hollow bolt inner threaded surface to control rotation of the first tie-rod end relative to the tie-rod central rod.

Clause 12: A system including a tie-rod with a swivel tie-rod end, comprising: the tie-rod including: a tie-rod central rod; a first tie-rod end includes a swivel joint, wherein the first tie-rod end is connected to the tie-rod central rod by the swivel joint and wherein the swivel joint is operable to enable rotation of the first tie-rod end with respect to the tie-rod central rod while maintaining a common longitudinal axis between the first tie-rod end and the tie-rod central rod; and a second tie-rod end connected to the tie-rod central rod; a first object connected to the first tie-rod end; and a second object connected to the second tie-rod end.

Clause 13: The system of Clause 12, wherein the first tie-rod end includes a first spherical bearing; wherein the second tie-rod end includes a second spherical bearing; and wherein the tie rod is operable to transmit an axial force through the tie-rod from the first object to the second object.

Clause 14. The system of Clause 13, wherein the first tie-rod end further includes a connective bearing portion including the first spherical bearing; wherein the swivel joint includes: a shoulder bolt attached to the connective bearing portion, wherein the shoulder bolt includes: a shoulder bolt unthreaded cylindrical portion; and a shoulder bolt head portion wider than the shoulder bolt unthreaded cylindrical portion; and a hollow bolt including: a hollow bolt drive head; a hollow bolt shaft including a hollow bolt outer threaded portion; and a hollow bolt inner unthreaded cylindrical surface extending along a longitudinal center of the hollow bolt; wherein the shoulder bolt unthreaded cylindrical portion is inserted within the hollow bolt inner unthreaded cylindrical surface; wherein the shoulder bolt unthreaded cylindrical portion is aligned to the hollow bolt inner unthreaded cylindrical surface and is operable to permit the shoulder bolt to rotate relative to the hollow bolt; wherein the tie-rod central rod includes a central rod inner threaded surface matingly engaged to the hollow bolt outer threaded portion; wherein the shoulder bolt includes a shoulder bolt outer threaded portion; and wherein the connective bearing portion includes a connective bearing inner threaded surface matingly engaged to the shoulder bolt outer threaded portion.

Clause 15: The system of Clause 14, further including a jam nut including a jam nut inner threaded surface; wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

Clause 16: The tie-rod of Clause 13, wherein the first tie-rod end further includes a connective bearing portion including the first spherical bearing; wherein the swivel joint includes: a shoulder bolt unitarily formed with the connective bearing portion, wherein the shoulder bolt includes: a shoulder bolt unthreaded cylindrical portion; and a shoulder bolt inner threaded surface within and coaxial to the shoulder bolt unthreaded cylindrical portion; a hollow bolt including: a hollow bolt drive head; a hollow bolt shaft including a hollow bolt outer threaded portion; and a hollow bolt inner unthreaded cylindrical surface extending along a longitudinal center of the hollow bolt; and a retention bolt including a retention bolt outer threaded portion matingly engaged to the shoulder bolt inner threaded surface; wherein the retention bolt secures the hollow bolt upon the shoulder bolt; wherein the shoulder bolt unthreaded cylindrical portion is inserted within the hollow bolt inner unthreaded cylindrical surface; wherein the shoulder bolt unthreaded cylindrical portion is aligned to the hollow bolt inner unthreaded cylindrical surface and is operable to permit the shoulder bolt to rotate relative to the hollow bolt; and wherein the tie-rod central rod includes a central rod inner threaded surface matingly engaged to the hollow bolt outer threaded portion.

Clause 17: The system of Clause 16, further including a jam nut including a jam nut inner threaded surface; wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

Clause 18: The system of Clause 13, wherein the first tie-rod end further includes a connective bearing portion including the first spherical bearing; wherein the swivel joint includes: a connective bearing outer threaded portion unitarily formed with the connective bearing portion and including a connective bearing inner threaded surface within and coaxial to the connective bearing outer threaded portion; a hollow bolt including: a hollow bolt drive head; a shaft including a hollow bolt outer threaded portion; and a hollow bolt inner threaded surface extending along a longitudinal center of the hollow bolt; and a retention bolt including a retention bolt outer threaded portion matingly engaged to the connective bearing inner threaded surface; wherein the connective bearing outer threaded portion is inserted and matingly engaged to the hollow bolt inner threaded surface; wherein the retention bolt limits travel of the hollow bolt upon the connective bearing outer threaded portion; and wherein the tie-rod central rod includes a central rod inner threaded surface matingly engaged to the hollow bolt outer threaded portion.

Clause 19: The system of Clause 18, wherein the connective bearing outer threaded portion is operable to rotate less than a complete rotation relative to the hollow bolt inner threaded surface to control rotation of the first tie-rod end relative to the tie-rod central rod; and wherein the connective bearing outer threaded portion is operable to rotate more than a complete rotation relative to the hollow bolt inner threaded surface to control a length of the tie-rod.

Clause 20: The system of Clause 18, further including a jam nut including a jam nut inner threaded surface; wherein the jam nut inner threaded surface is matingly engaged to the hollow bolt outer threaded portion; wherein the jam nut is operable to limit how far the hollow bolt outer threaded portion is engaged to the central rod inner threaded surface and is operable to control a length of the tie-rod; and wherein the connective bearing outer threaded portion is operable to rotate relative to the hollow bolt inner threaded surface to control rotation of the first tie-rod end relative to the tie-rod central rod.

The components of the disclosed embodiments, as described and illustrated herein, may be arranged and designed in a variety of different configurations. Thus, the detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

Furthermore, the detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A tie-rod with a swivel tie-rod end, comprising:
   a tie-rod central rod;
   a first tie-rod end including a swivel joint, wherein the first tie-rod end is connected to the tie-rod central rod by the swivel joint and wherein the swivel joint is operable to enable rotation of the first tie-rod end with respect to the tie-rod central rod while maintaining a common longitudinal axis between the first tie-rod end and the tie-rod central rod; and
   a second tie-rod end connected to the tie-rod central rod;
   wherein the first tie-rod end further includes a connective bearing portion operable to enable attachment of the tie-rod to a neighboring object;
   wherein the swivel joint includes:
      a hollow bolt including a hollow bolt shaft having a hollow bolt outer threaded portion; and
      a shoulder bolt attached to the connective bearing portion and inserted through the hollow bolt to thereby connect the shoulder bolt to the first tie-rod end;
   wherein the tie-rod central rod includes a central rod inner threaded surface matingly engaged to the hollow bolt outer threaded portion.

2. The tie-rod of claim 1,
   wherein the shoulder bolt further includes:
      a shoulder bolt unthreaded cylindrical portion; and
      a shoulder bolt head portion wider than the shoulder bolt unthreaded cylindrical portion; and
   wherein the hollow bolt further includes:
      a hollow bolt drive head; and
      a hollow bolt inner unthreaded cylindrical surface extending along a longitudinal center of the hollow bolt;

wherein the shoulder bolt unthreaded cylindrical portion is inserted within the hollow bolt inner unthreaded cylindrical surface; and wherein the shoulder bolt unthreaded cylindrical portion is aligned to the hollow bolt inner unthreaded cylindrical surface and is operable to permit the shoulder bolt to rotate relative to the hollow bolt.

3. The tie-rod of claim 2, wherein the shoulder bolt includes a shoulder bolt threaded portion; and wherein the connective bearing portion includes a connective bearing inner threaded surface matingly engaged to the shoulder bolt threaded portion.

4. The tie-rod of claim 2, further including a jam nut including a jam nut inner threaded surface;

wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

5. The tie-rod of claim 1, wherein the shoulder bolt is unitarily formed with the connective bearing portion, wherein the shoulder bolt includes:

a shoulder bolt unthreaded cylindrical portion; and a shoulder bolt inner threaded surface within and coaxial to the shoulder bolt unthreaded cylindrical portion;

wherein the hollow bolt further includes:

a hollow bolt drive head; and a hollow bolt inner unthreaded cylindrical surface extending along a longitudinal center of the hollow bolt; and a retention bolt including a retention bolt outer threaded portion matingly engaged to the shoulder bolt inner threaded surface;

wherein the retention bolt secures the hollow bolt upon the shoulder bolt;

wherein the shoulder bolt unthreaded cylindrical portion is inserted within the hollow bolt inner unthreaded cylindrical surface; and wherein the shoulder bolt unthreaded cylindrical portion is aligned to the hollow bolt inner unthreaded cylindrical surface and is operable to permit the shoulder bolt to rotate relative to the hollow bolt.

6. The tie-rod of claim 5, further including a jam nut including a jam nut inner threaded surface;

wherein the jam nut inner threaded surface is matingly engaged to the hollow bolt outer threaded portion; and wherein the jam nut is operable to limit how far the hollow bolt outer threaded portion is engaged to the central rod inner threaded surface and is operable to control a length of the tie-rod.

7. The tie-rod of claim 1, wherein the swivel joint includes:

a connective bearing outer threaded portion unitarily formed with the connective bearing portion and including a connective bearing inner threaded surface within and coaxial to the connective bearing outer threaded portion;

wherein the hollow bolt further includes:

a hollow bolt drive head; and a hollow bolt inner threaded surface extending along a longitudinal center of the hollow bolt; and a retention bolt including a retention bolt outer threaded portion matingly engaged to the connective bearing inner threaded surface;

wherein the connective bearing outer threaded portion is inserted and matingly engaged to the hollow bolt inner threaded surface; and wherein the retention bolt limits travel of the hollow bolt upon the connective bearing outer threaded portion.

8. The tie-rod of claim 7, wherein the connective bearing outer threaded portion is operable to rotate less than a complete rotation relative to the hollow bolt inner threaded surface to control rotation of the first tie-rod end relative to the tie-rod central rod; and wherein the connective bearing threaded portion is operable to rotate more than a complete rotation relative to the hollow bolt inner threaded surface to control a length of the tie-rod.

9. The tie-rod of claim 7, further including a jam nut including a jam nut inner threaded surface;

wherein the jam nut inner threaded surface is matingly engaged to the hollow bolt outer threaded portion; and wherein the jam nut is operable to limit how far the hollow bolt outer threaded portion engaged to the central rod inner threaded surface and is operable to control a length of the tie-rod.

10. The tie-rod of claim 9, wherein the connective bearing outer threaded portion is operable to rotate relative to the hollow bolt inner threaded surface to control rotation of the first tie-rod end relative to the tie-rod central rod.

11. A system including a tie-rod with a swivel tie-rod end, comprising:

the tie-rod including:

a tie-rod central rod;

a first tie-rod end including a swivel joint, wherein the first tie-rod end is connected to the tie-rod central rod by the swivel joint and wherein the swivel joint is operable to enable rotation of the first tie-rod end with respect to the tie-rod central rod while maintaining a common longitudinal axis between the first tie-rod end and the tie-rod central rod; and a second tie-rod end connected to the tie-rod central rod;

a first object connected to the first tie-rod end; and a second object connected to the second tie-rod end;

wherein the first tie-rod end includes a connective bearing portion having a first spherical bearing;

wherein the second tie-rod end includes a second spherical bearing; and wherein the tie rod is operable to transmit an axial force through the tie-rod from the first object to the second object;

wherein the swivel joint includes:

a hollow bolt including a hollow bolt shaft having a hollow bolt outer threaded portion; and a shoulder bolt attached to the connective bearing portion and inserted through the hollow bolt to thereby connect the shoulder bolt to the first tie-rod end;

wherein the tie-rod central rod includes a central rod inner threaded surface matingly engaged to the hollow bolt outer threaded portion.

12. The system of claim 11, wherein the shoulder bolt is attached to the connective bearing portion, and wherein the shoulder bolt includes:

a shoulder bolt unthreaded cylindrical portion; and a shoulder bolt head portion wider than the shoulder bolt unthreaded cylindrical portion;
wherein the hollow bolt further includes:
a hollow bolt drive head; and
a hollow bolt inner unthreaded cylindrical surface extending along a longitudinal center of the hollow bolt;
wherein the hollow bolt shaft includes a hollow bolt outer threaded portion;
wherein the shoulder bolt unthreaded cylindrical portion is inserted within the hollow bolt inner unthreaded cylindrical surface;
wherein the shoulder bolt unthreaded cylindrical portion is aligned to the hollow bolt inner unthreaded cylindrical surface and is operable to permit the shoulder bolt to rotate relative to the hollow bolt;
wherein the shoulder bolt includes a shoulder bolt outer threaded portion; and
wherein the connective bearing portion includes a connective bearing inner threaded surface matingly engaged to the shoulder bolt outer threaded portion.

13. The system of claim 12, further including a jam nut including a jam nut inner threaded surface;
wherein the jam nut inner threaded surface is matingly engaged to the hollow bolt outer threaded portion; and
wherein the jam nut is operable to limit how far the hollow bolt outer threaded portion is engaged to the central rod inner threaded surface and is operable to control a length of the tie-rod.

14. The system of claim 11,
wherein the
shoulder bolt is unitarily formed with the connective bearing portion, and wherein the shoulder bolt includes:
a shoulder bolt unthreaded cylindrical portion; and
a shoulder bolt inner threaded surface within and coaxial to the shoulder bolt unthreaded cylindrical portion;
wherein the hollow bolt further includes:
a hollow bolt drive head; and
a hollow bolt inner unthreaded cylindrical surface extending along a longitudinal center of the hollow bolt; and
a retention bolt including a retention bolt outer threaded portion matingly engaged to the shoulder bolt inner threaded surface;
wherein the retention bolt secures the hollow bolt upon the shoulder bolt;
wherein the shoulder bolt unthreaded cylindrical portion is inserted within the hollow bolt inner unthreaded cylindrical surface; and
wherein the shoulder bolt unthreaded cylindrical portion is aligned to the hollow bolt inner unthreaded cylindrical surface and is operable to permit the shoulder bolt to rotate relative to the hollow bolt.

15. The system of claim 14, further including a jam nut including a jam nut inner threaded surface;
wherein the jam nut inner threaded surface is matingly engaged to the hollow bolt outer threaded portion; and
wherein the jam nut is operable to limit how far the hollow bolt outer threaded portion is engaged to the central rod inner threaded surface and is operable to control a length of the tie-rod.

16. The system of claim 11,
wherein the swivel joint includes:
a connective bearing outer threaded portion unitarily formed with the connective bearing portion and including a connective bearing inner threaded surface within and coaxial to the connective bearing outer threaded portion;
a hollow bolt including:
a hollow bolt drive head; and
a hollow bolt inner threaded surface extending along a longitudinal center of the hollow bolt; and
a retention bolt including a retention bolt outer threaded portion matingly engaged to the connective bearing inner threaded surface;
wherein the connective bearing outer threaded portion is inserted and matingly engaged to the hollow bolt inner threaded surface; and
wherein the retention bolt limits travel of the hollow bolt upon the connective bearing outer threaded portion.

17. The system of claim 16, wherein the connective bearing outer threaded portion is operable to rotate less than a complete rotation relative to the hollow bolt inner threaded surface to control rotation of the first tie-rod end relative to the tie-rod central rod; and
wherein the connective bearing outer threaded portion is operable to rotate more than a complete rotation relative to the hollow bolt inner threaded surface to control a length of the tie-rod.

18. The system of claim 16, further including a jam nut including a jam nut inner threaded surface;
wherein the jam nut inner threaded surface is matingly engaged to the hollow bolt outer threaded portion;
wherein the jam nut is operable to limit how far the hollow bolt outer threaded portion is engaged to the central rod inner threaded surface and is operable to control a length of the tie-rod; and
wherein the connective bearing outer threaded portion is operable to rotate relative to the hollow bolt inner threaded surface to control rotation of the first tie-rod end relative to the tie-rod central rod.

* * * * *